US012681137B2

(12) United States Patent
Sahara et al.

(10) Patent No.: US 12,681,137 B2
(45) Date of Patent: Jul. 14, 2026

(54) ELECTRONIC DEVICE, METHOD FOR CONTROLLING ELECTRONIC DEVICE, AND PROGRAM

(71) Applicant: KYOCERA Corporation, Kyoto (JP)

(72) Inventors: Tooru Sahara, Yokohama (JP); Jun Kuroda, Kodaira (JP); Kenji Yamamoto, Yokohama (JP); Takuya Homma, Yokohama (JP); Fangwei Tong, Fukuoka (JP)

(73) Assignee: KYOCERA Corporation, Kyoto (JP)

( * ) Notice: Subject to any disclaimer, the term of this patent is extended or adjusted under 35 U.S.C. 154(b) by 229 days.

(21) Appl. No.: 18/575,956

(22) PCT Filed: Jul. 8, 2022

(86) PCT No.: PCT/JP2022/027171
§ 371 (c)(1),
(2) Date: Jan. 2, 2024

(87) PCT Pub. No.: WO2023/002870
PCT Pub. Date: Jan. 26, 2023

(65) Prior Publication Data
US 2024/0310478 A1 Sep. 19, 2024

(30) Foreign Application Priority Data
Jul. 21, 2021 (JP) ................................. 2021-120869

(51) Int. Cl.
| | |
|---|---|
| *G01S 7/282* | (2006.01) |
| *G01S 13/32* | (2006.01) |
| *G01S 13/931* | (2020.01) |

(52) U.S. Cl.
CPC .............. *G01S 7/282* (2013.01); *G01S 13/32* (2013.01); *G01S 13/931* (2013.01)

(58) Field of Classification Search
CPC ......... G01S 7/282; G01S 13/32; G01S 13/931
(Continued)

(56) References Cited

U.S. PATENT DOCUMENTS

| | | | | |
|---|---|---|---|---|
| 5,982,321 A | * | 11/1999 | Lihoshi | .................. G01S 13/34 |
| | | | | 342/146 |
| 10,334,177 B2 | * | 6/2019 | Oshima | .................. H04N 23/73 |

(Continued)

FOREIGN PATENT DOCUMENTS

| | | | | | |
|---|---|---|---|---|---|
| DE | 102014009869 A1 | * | 1/2016 | ............... | G01S 7/40 |
| EP | 0886149 A2 | * | 12/1998 | ............. | G01S 13/34 |

(Continued)

*Primary Examiner* — Nuzhat Pervin
(74) *Attorney, Agent, or Firm* — Studebaker Brackett PLLC

(57) ABSTRACT

An electronic device includes a transmission antenna, a reception antenna, a signal processor, a quality determining unit, and a controller. The transmission antenna transmits a transmission wave. The reception antenna receives a reflected wave that is the transmission wave having been reflected. The signal processor calculates, based on a transmission signal transmitted as the transmission wave and a reception signal received as the reflected wave, a distance between the electronic device and an object that reflects the transmission wave. The quality determining unit determines a quality of the reception signal. The controller performs control for transmitting the transmission wave in an operation mode corresponding to the distance between the electronic device and the object, based on the quality of the reception signal determined by the quality determining unit.

9 Claims, 7 Drawing Sheets

(58) Field of Classification Search
USPC ........................................................... 342/82
See application file for complete search history.

(56) References Cited

U.S. PATENT DOCUMENTS

| | | | | |
|---|---|---|---|---|
| 10,447,390 | B2 * | 10/2019 | Oshima | E05F 15/43 |
| 10,638,051 | B2 * | 4/2020 | Oshima | H04N 23/73 |
| 10,718,862 | B2 * | 7/2020 | Asanuma | G01S 13/68 |
| 10,992,185 | B2 * | 4/2021 | Leabman | A61B 8/56 |
| 10,992,187 | B2 * | 4/2021 | Leabman | H02J 50/40 |
| 11,002,859 | B1 * | 5/2021 | Zhang | G01S 19/393 |
| 11,204,605 | B1 * | 12/2021 | Allais | G05D 1/0238 |
| 11,784,732 | B2 * | 10/2023 | Fink | H01Q 3/46 |
| | | | | 455/77 |
| 11,797,836 | B1 * | 10/2023 | Evans | G01S 17/931 |
| 11,824,933 | B2 * | 11/2023 | Binder | H04L 67/12 |
| 12,088,923 | B2 * | 9/2024 | Oshima | H04B 10/516 |
| 2007/0285649 | A1 * | 12/2007 | Nakamura | G01S 17/42 |
| | | | | 356/5.05 |
| 2013/0016001 | A1 * | 1/2013 | Schoeberl | G01S 13/426 |
| | | | | 342/129 |
| 2014/0002296 | A1 * | 1/2014 | Izumi | G01S 13/345 |
| | | | | 342/149 |
| 2017/0097409 | A1 * | 4/2017 | Okamoto | G01S 13/345 |
| 2017/0363732 | A1 * | 12/2017 | Ishimori | G01S 7/354 |
| 2019/0113602 | A1 * | 4/2019 | Matsumoto | G01S 13/584 |
| 2020/0201351 | A1 * | 6/2020 | Armstrong-Crews | |
| | | | | G01S 13/931 |
| 2020/0225337 | A1 * | 7/2020 | Kishigami | G01S 7/41 |
| 2020/0225340 | A1 * | 7/2020 | Fujii | G08G 1/16 |
| 2020/0249343 | A1 * | 8/2020 | Yu | G01S 13/93 |
| 2021/0011161 | A1 * | 1/2021 | Chen | G06N 3/045 |
| 2021/0132191 | A1 * | 5/2021 | Takada | G01S 13/931 |
| 2021/0149037 | A1 * | 5/2021 | Choi | G01S 13/34 |
| 2021/0181329 | A1 * | 6/2021 | Kashiwagi | G01S 13/343 |
| 2021/0209785 | A1 * | 7/2021 | Unnikrishnan | G01S 7/41 |
| 2021/0341598 | A1 * | 11/2021 | Sahara | G01S 13/931 |
| 2022/0268877 | A1 * | 8/2022 | Uchida | G01S 7/006 |
| 2023/0208198 | A1 * | 6/2023 | Leabman | H02J 50/20 |
| | | | | 307/104 |
| 2023/0230368 | A1 * | 7/2023 | Shokonji | G06V 10/80 |
| | | | | 702/152 |
| 2023/0359162 | A1 * | 11/2023 | Kriveshko | G01S 17/04 |
| 2024/0030739 | A1 * | 1/2024 | Leabman | H02J 7/04 |
| 2025/0337505 | A1 * | 10/2025 | Harper | H04B 1/0458 |

FOREIGN PATENT DOCUMENTS

| | | | | |
|---|---|---|---|---|
| EP | 0 886 149 | B1 | 9/2004 | |
| EP | 3543736 | A1 * | 9/2019 | G01S 13/93 |
| JP | H04-278487 | A | 10/1992 | |
| JP | H08-334557 | A | 12/1996 | |
| JP | H11-6872 | A | 1/1999 | |
| JP | 2003-185741 | A | 7/2003 | |
| JP | 2008275331 | A * | 11/2008 | |
| JP | 2018115936 | A * | 7/2018 | G01S 13/343 |
| JP | 2020106432 | A * | 7/2020 | G01S 13/343 |

* cited by examiner

FROM RECEPTION UNIT

40

41 DISTANCE FFT PROCESSING UNIT

42 VELOCITY FFT PROCESSING UNIT

43 THRESHOLD DETERMINING UNIT

44 ANGLE-OF-ARRIVAL ESTIMATING UNIT

45 OBJECT DETECTING UNIT

46 QUALITY DETERMINING UNIT

47 OBJECT TRACKING UNIT

48 STORAGE UNIT

CONTROLLER

DETECTION RESULT
(TO ECU, ETC.)

ELECTRONIC DEVICE, METHOD FOR CONTROLLING ELECTRONIC DEVICE, AND PROGRAM

CROSS-REFERENCE TO RELATED APPLICATIONS

This application claims priority from Japanese Patent Application No. 2021-120869 filed in Japan on Jul. 21, 2021, the entire disclosure of which is incorporated herein by reference.

TECHNICAL FIELD

The present disclosure relates to an electronic device, a method for controlling an electronic device, and a program.

BACKGROUND OF INVENTION

For example, in fields such as automobile-related industries, a technology for measuring a distance or the like between a vehicle of interest and a predetermined object is regarded as important. Recently, various studies have been conducted particularly on a radar (Radio Detecting and Ranging) technology for measuring a distance or the like to an object such as an obstacle by transmitting a radio wave such as a millimeter wave and then receiving a reflected wave reflected off the object. Such a technology for measuring a distance or the like is expected to be more important in the future with progresses of a technology for assisting drivers in driving and an automated-driving-related technology for partially or entirely automating driving.

Some suggestions have been made on a technology that may improve the accuracy of detecting the presence of a predetermined object by receiving a reflected wave of a radio wave that has been transmitted and reflected off the object. For example, Patent Literature 1 has proposed controlling a threshold for determining detection in accordance with the intensity of a signal for detecting an object.

CITATION LIST

Patent Literature

Patent Literature 1: Japanese Unexamined Patent Application Publication No. 2003-185741

SUMMARY

In one embodiment, an electronic device includes a transmission antenna, a reception antenna, a signal processor, a quality determining unit, and a controller.

The transmission antenna transmits a transmission wave.

The reception antenna receives a reflected wave that is the transmission wave having been reflected.

The signal processor calculates, based on a transmission signal transmitted as the transmission wave and a reception signal received as the reflected wave, a distance between the electronic device and an object that reflects the transmission wave.

The quality determining unit determines a quality of the reception signal.

The controller performs control for transmitting the transmission wave in an operation mode corresponding to the distance between the electronic device and the object, based on the quality of the reception signal determined by the quality determining unit.

In one embodiment, a method for controlling an electronic device includes transmitting a transmission wave;

receiving a reflected wave that is the transmission wave having been reflected;

calculating, based on a transmission signal transmitted as the transmission wave and a reception signal received as the reflected wave, a distance between the electronic device and an object that reflects the transmission wave;

determining a quality of the reception signal; and performing control for transmitting the transmission wave in an operation mode corresponding to the distance between the electronic device and the object, based on the quality of the reception signal.

In one embodiment, a program causes an electronic device to execute transmitting a transmission wave;

receiving a reflected wave that is the transmission wave having been reflected;

calculating, based on a transmission signal transmitted as the transmission wave and a reception signal received as the reflected wave, a distance between the electronic device and an object that reflects the transmission wave;

determining a quality of the reception signal; and performing control for transmitting the transmission wave in an operation mode corresponding to the distance between the electronic device and the object, based on the quality of the reception signal.

DESCRIPTION OF EMBODIMENTS

Figure 1:
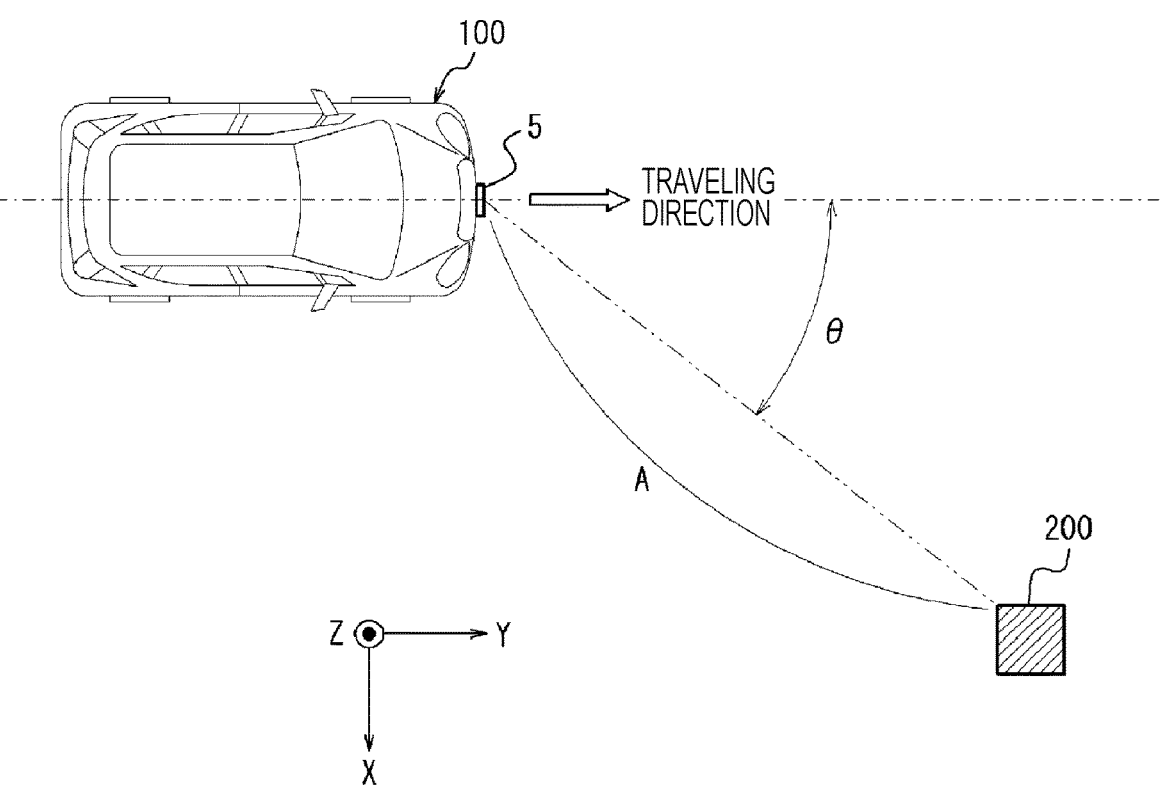
FIG. 1 is a diagram for describing how an electronic device according to one embodiment is used.

The detection accuracy is desirably improved in a technology for detecting a predetermined object by receiving a reflected wave that is a transmission wave reflected off the object. The present disclosure provides an electronic device, a method for controlling an electronic device, and a program that contribute to improvement of the object detection accuracy. According to one embodiment, an electronic device, a method for controlling an electronic device, and a program that contribute to improvement of the object detection accuracy can be provided. One embodiment is described in detail below with reference to the drawings.

In the present disclosure, the term "electronic device" may refer to a device driven by electric power supplied from a power system or a battery, for example. In the present disclosure, the term "user" may refer to an entity (typically, a person) that uses or can use an electronic device according to one embodiment and an entity that uses or can use a system including the electronic device according to the one embodiment.

An electronic device according to one embodiment is mounted in a vehicle (mobility device) such as an automobile, for example, and is capable of detecting, as a target, a predetermined object located around the mobility device. To this end, the electronic device according to the one embodiment is capable of transmitting a transmission wave to an area around the mobility device from a transmission antenna installed on or in the mobility device. The electronic device according to the one embodiment is also capable of receiving, from a reception antenna installed on or in the mobility device, a reflected wave that is the reflected transmission wave. For example, a radar sensor or the like installed on or in the mobility device may include at least one of the transmission antenna or the reception antenna.

A typical configuration example is described below in which the electronic device according to the one embodiment is mounted in an automobile such as a passenger car. However, the mobility device in which the electronic device according to the one embodiment is mounted is not limited to an automobile. The electronic device according to the one embodiment may be mounted in various mobility devices such as an autonomous car, a bus, a truck, a taxi, a motorcycle, a bicycle, a ship, an aircraft, a helicopter, agricultural machinery such as a tractor, a snowplow, a garbage truck, a police car, an ambulance, and a drone. The mobility device in which the electronic device according to the one embodiment is mounted is not necessarily limited to a mobility device that moves by its own motive power. For example, the mobility device in which the electronic device according to the one embodiment is mounted may be a trailer towed by a tractor. The electronic device according to the one embodiment is capable of measuring a distance or the like between a sensor and a predetermined object when at least one of the sensor or the object is movable. The electronic device according to the one embodiment is also capable of measuring a distance or the like between the sensor and the object even when both the sensor and the object are stationary. The automobile encompassed by the present disclosure is not limited by the overall length, the overall width, the overall height, the displacement, the seating capacity, the load, or the like. For example, the automobiles of the present disclosure include an automobile having a displacement greater than 660 cc and an automobile having a displacement equal to or less than 660 cc that is a so-called light automobile. The automobiles encompassed by the present disclosure also include an automobile that partially or entirely uses electricity as energy and uses a motor.

An example of how the electronic device according to the one embodiment detects an object is described.

FIG. 1 is a diagram for describing how the electronic device according to the one embodiment is used. FIG. 1 illustrates an example in which a sensor, including a transmission antenna and a reception antenna, according to the one embodiment is installed on a mobility device.

A sensor 5, including a transmission antenna and a reception antenna, according to the one embodiment is installed on a mobility device 100 illustrated in FIG. 1. The mobility device 100 illustrated in FIG. 1 includes an electronic device 1 according to the one embodiment mounted (for example, built) therein. A specific configuration of the electronic device 1 is described later. The sensor 5 may include at least one of the transmission antenna or the reception antenna, for example. The sensor 5 may appropriately include at least any of other functional units, such as at least part of a controller 10 (see FIG. 2) included in the electronic device 1. The mobility device 100 illustrated in FIG. 1 may be an automotive vehicle such as a passenger car but may be a mobility device of any type. In FIG. 1, the mobility device 100 may move (travel or slowly travel), for example, in a positive Y-axis direction (traveling direction) illustrated in FIG. 1 or in another direction, or may be stationary without moving.

As illustrated in FIG. 1, the sensor 5 including the transmission antenna is installed on the mobility device 100. In the example illustrated in FIG. 1, only one sensor 5 including the transmission antenna and the reception antenna is installed at a front portion of the mobility device 100. The position where the sensor 5 is installed on the mobility device 100 is not limited to the position illustrated in FIG. 1 and may be another appropriate position. For example, the sensor 5 illustrated in FIG. 1 may be installed on a left side, on a right side, and/or at a rear portion of the mobility device 100. The number of such sensors 5 may be any number equal to or greater than 1 depending on various conditions (or requirements) such as a range and/or an accuracy of measurement performed at the mobility device 100. The sensor 5 may be installed inside the mobility device 100. The inside the mobility device 100 may be, for example, a space inside a bumper, a space inside a body, a space inside a headlight, or a space such as a driver's space.

The sensor 5 transmits an electromagnetic wave as a transmission wave from the transmission antenna. For example, when a predetermined object (for example, an object 200 illustrated in FIG. 1) is located around the mobility device 100, at least part of the transmission wave transmitted from the sensor 5 is reflected off the object to become a reflected wave. For example, the reception antenna of the sensor 5 receives such a reflected wave. In this manner, the electronic device 1 mounted in the mobility device 100 can detect the object as a target.

The sensor 5 including the transmission antenna may be typically a radar (Radio Detecting and Ranging) sensor that transmits and receives a radio wave. However, the sensor 5 is not limited to a radar sensor. The sensor 5 according to the one embodiment may be, for example, a sensor based on the LIDAR (Light Detection and Ranging, Laser Imaging Detection and Ranging) technology that uses an optical wave. Each of these sensors can include, for example, a patch antenna. Since the technologies such as RADAR and LIDAR are already known, detailed description may be appropriately simplified or omitted.

The electronic device 1 mounted in the mobility device 100 illustrated in FIG. 1 receives, from the reception antenna, the reflected wave of the transmission wave transmitted from the transmission antenna of the sensor 5. In this manner, the electronic device 1 can detect, as the target, the predetermined object 200 located within a predetermined distance from the mobility device 100. For example, as illustrated in FIG. 1, the electronic device 1 can measure (estimate) a distance A between the mobility device 100, which is a vehicle of interest, and the predetermined object 200. The electronic device 1 can also measure (estimate) a relative velocity between the mobility device 100, which is the vehicle of interest, and the predetermined object 200. The electronic device 1 can further measure (estimate) a direction (an angle of arrival $\theta$) from which the reflected wave from the predetermined object 200 arrives at the mobility device 100, which is the vehicle of interest.

The object 200 may be, for example, at least any of an oncoming automobile traveling in a lane adjacent to a lane of the mobility device 100, an automobile traveling next to the mobility device 100, an automobile traveling in front of or behind the mobility device 100 in the same lane, and the like. The object 200 may also be any object located around the mobility device 100, such as a motorcycle, a bicycle, a stroller, a person such as a pedestrian, an animal, other forms of life such as an insect, a guardrail, a median strip, a road sign, a step on a sidewalk, a wall, a maintenance hole, or an obstacle. The object 200 may be in motion or stationary. For example, the object 200 may be an automobile or the like that is parked or stationary around the mobility device 100. In the present disclosure, the object detected by the sensor 5 includes a living thing such as a person or an animal in addition to a non-living thing. The object detected by the sensor 5 in the present disclosure includes a target, which includes a person, an object, and an animal, to be detected with the radar technology.

In FIG. 1, a ratio between a size of the sensor 5 and a size of the mobility device 100 does not necessarily indicate an actual ratio. FIG. 1 illustrates the sensor 5 that is installed at an outer portion of the mobility device 100. However, in one embodiment, the sensor 5 may be installed at various positions of the mobility device 100. For example, in one embodiment, the sensor 5 may be installed inside the bumper of the mobility device 100 so as not to appear on the external appearance of the mobility device 100.

Description is given below on the assumption that the transmission antenna of the sensor 5 transmits a radio wave in a frequency band, such as a millimeter wave (equal to or higher than 30 GHz) or a quasi-millimeter wave (for example, around 20 GHz to 30 GHz) as a typical example. For example, the transmission antenna of the sensor 5 may transmit a radio wave having a frequency bandwidth of 4 GHz such as from 77 GHz to 81 GHz.

Figure 2:
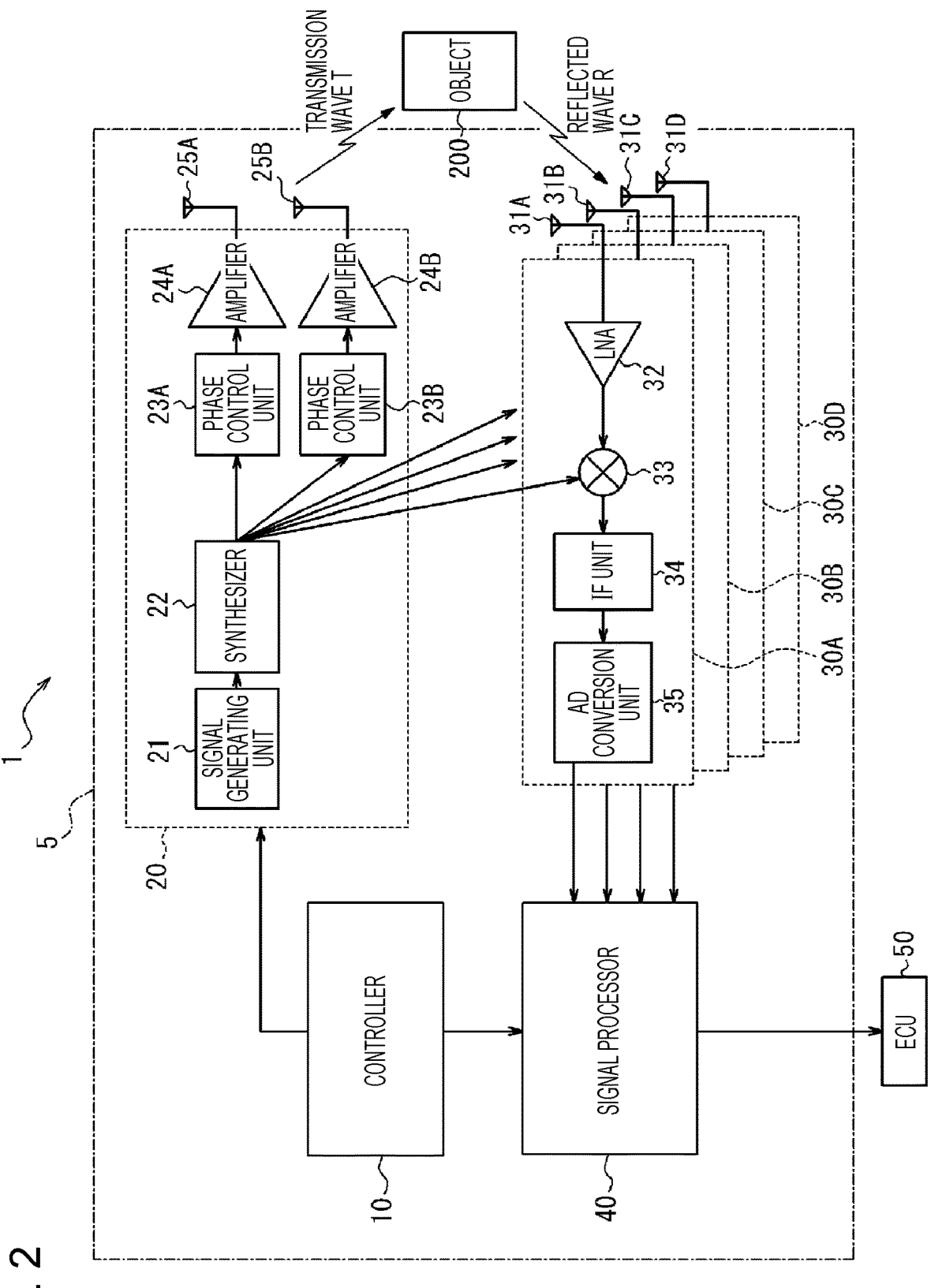
FIG. 2 is a functional block diagram schematically illustrating a configuration of the electronic device according to the one embodiment.

FIG. 2 is a functional block diagram schematically illustrating a configuration example of the electronic device 1 according to the one embodiment. An example of the configuration of the electronic device 1 according to the one embodiment is described below.

When a distance or the like is measured by using a millimeter-wave radar, a frequency-modulated continuous wave radar (hereinafter, referred to as an FMCW radar) is often used. The FMCW radar sweeps a frequency of a to-be-transmitted radio wave to generate a transmission signal. Thus, a frequency of the radio wave used by such a millimeter-wave FMCW radar, which uses a radio wave of a frequency band of 79 GHz, for example, has a frequency bandwidth of 4 GHz such as from 77 GHz to 81 GHz, for example. The radar of the frequency band of 79 GHz has a feature that a usable frequency bandwidth is wider than other millimeter-wave and/or quasi-millimeter-wave radars of frequency bands of 24 GHz, 60 GHz, and 76 GHz, for example. Such an embodiment is described below as an example.

As illustrated in FIG. 2, the electronic device 1 according to the one embodiment includes the sensor 5 and an ECU (Electronic Control Unit) 50. The ECU 50 controls various operations of the mobility device 100. The ECU 50 may include at least one or more ECUs. The electronic device 1 according to the one embodiment may include the controller 10. The electronic device 1 according to the one embodiment may also appropriately include another functional unit such as at least any of the transmission unit 20 or reception units 30A to 30D. The electronic device 1 according to the one embodiment may further includes a signal processor 40.

As illustrated in FIG. 2, the electronic device 1 may include multiple reception units such as the reception units 30A to 30D. When the reception units 30A, 30B, 30C, and 30D are not distinguished from one another, the reception units 30A, 30B, 30C, and 30D are simply referred to as "reception units 30" below.

Figure 3:
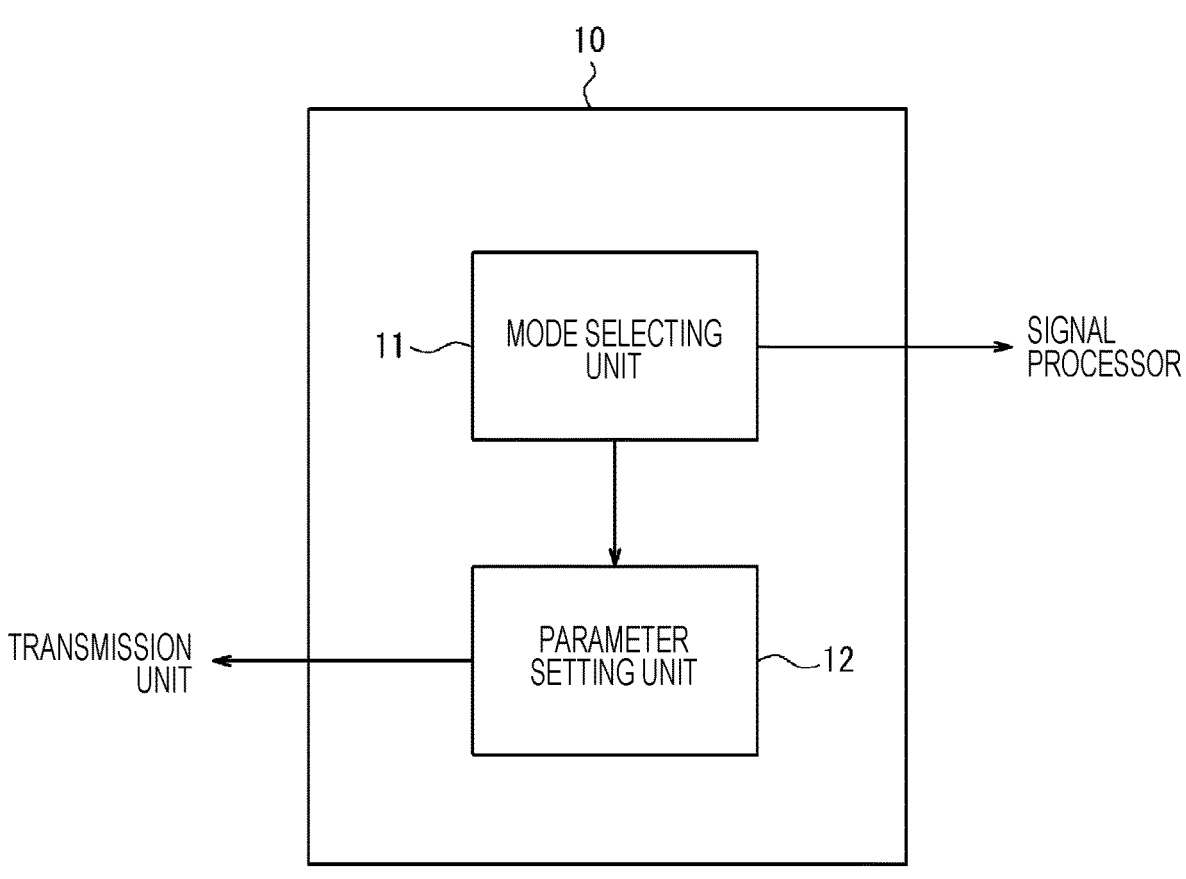
FIG. 3 is a block diagram schematically illustrating functions of a controller of the electronic device according to the one embodiment.

FIG. 3 is a block diagram schematically illustrating functions of the controller 10 illustrated in FIG. 2. As illustrated in FIG. 3, the controller 10 may include a mode selecting unit 11 and a parameter setting unit 12. These functional units included in the controller 10 are further described later.

Figure 4:
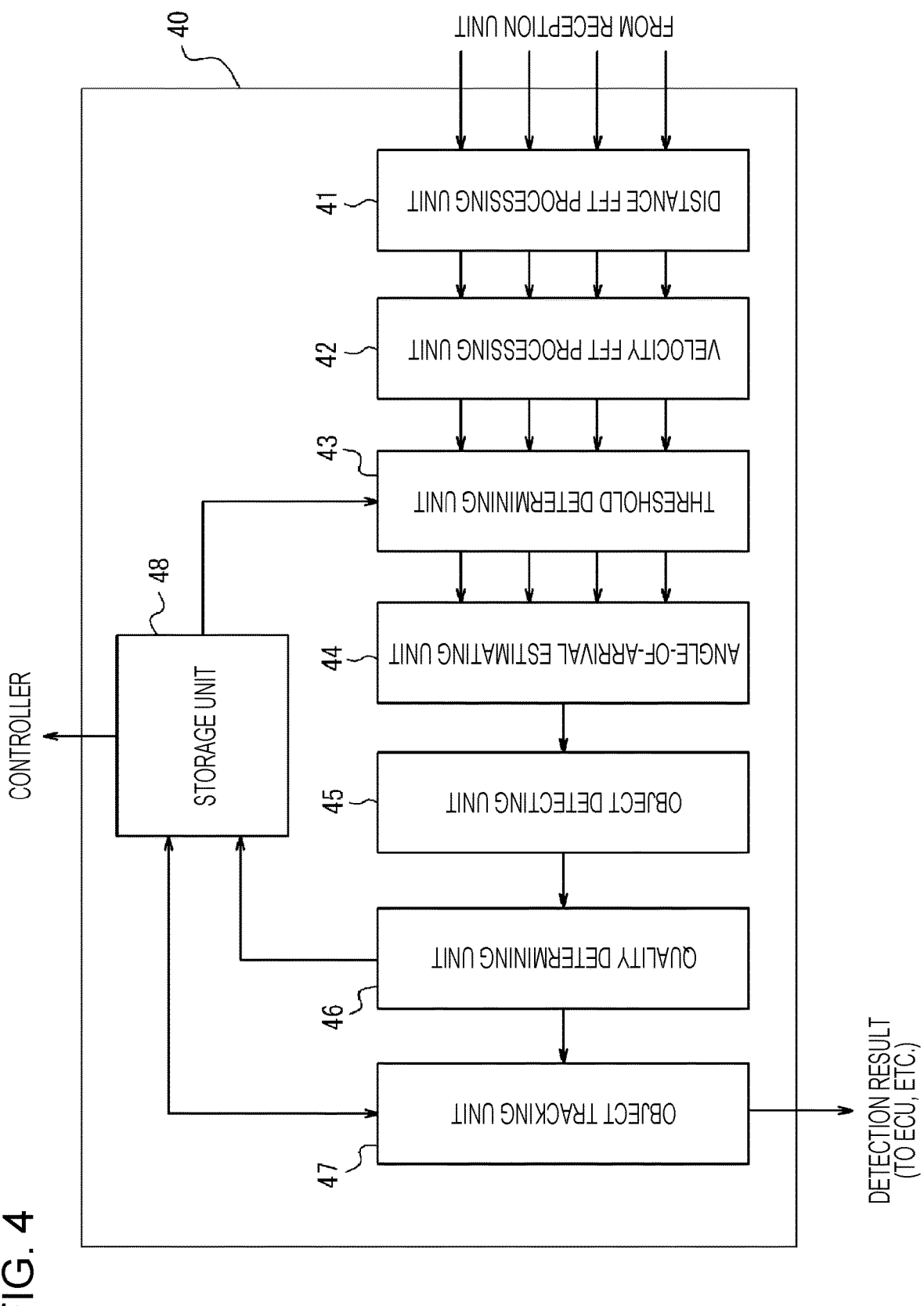
FIG. 4 is a block diagram schematically illustrating functions of a signal processor of the electronic device according to the one embodiment.

FIG. 4 is a block diagram schematically illustrating functions of the signal processor 40 illustrated in FIG. 2. As illustrated in FIG. 4, the signal processor 40 may include a distance FFT processing unit 41, a velocity FFT processing unit 42, a threshold determining unit 43, an angle-of-arrival estimating unit 44, an object detecting unit 45, a quality determining unit 46, an object tracking unit 47, and a storage unit 48. These functional units included in the signal processor 40 are further described later.

As illustrated in FIG. 2, the transmission unit 20 may include a signal generating unit 21, a synthesizer 22, phase control units 23A and 23B, amplifiers 24A and 24B, and transmission antennas 25A and 25B. When the phase control units 23A and 23B are not distinguished from each other, the phase control units 23A and 23B are simply referred to as "phase control units 23" below. When the amplifiers 24A and 24B are not distinguished from each other, the amplifiers 24A and 24B are simply referred to as "amplifiers 24" below. When the transmission antennas 25A and 25B are not distinguished from each other, the transmission antennas 25A and 25B are simply referred to as "transmission antennas 25" below.

As illustrated in FIG. 2, each of the reception units 30 may include a respective one of reception antennas 31A to 31D. When the reception antennas 31A, 31B, 31C, and 31D are not distinguished from one another, the reception antennas 31A, 31B, 31C, and 31D are simply referred to as "reception antennas 31" below. As illustrated in FIG. 2, each of the multiple reception units 30 may include an LNA 32, a mixer 33, an IF unit 34, and an AD conversion unit 35. The reception units 30A to 30D may have the same and/or similar configuration. FIG. 2 schematically illustrates the configuration of only the reception unit 30A as a representative example.

The sensor 5 described above may include, for example, the transmission antennas 25 and the reception antennas 31. The sensor 5 may also appropriately include at least any of other functional units such as the controller 10 and the signal processor 40.

The controller 10 included in the electronic device 1 according to the one embodiment is capable of controlling the individual functional units of the electronic device 1 and controlling operations of the entire electronic device 1. To provide control and/or processing capabilities for executing various functions, the controller 10 may include at least one processor, for example, a CPU (Central Processing Unit) or a DSP (Digital Signal Processor). The controller 10 may be collectively implemented by one processor, may be implemented by some processors, or may be implemented by discrete individual processors. The processor may be implemented as one integrated circuit. The integrated circuit is also referred to as an IC. The processor may be implemented as multiple integrated circuits and discrete circuits connected to be able to perform communication. The processor may be implemented based on various other known technologies. In the one embodiment, the controller 10 may be configured as, for example, a CPU (hardware) and a program (software) executed by the CPU. The controller 10 may appropriately include a memory necessary for operations of the controller 10.

In the electronic device 1 according to the one embodiment, the controller 10 may control at least one of the transmission unit 20 or the reception units 30. In this case, the controller 10 may control at least one of the transmission unit 20 or the reception units 30, based on various kinds of information stored in any storage unit (memory). In the electronic device 1 according to the one embodiment, the controller 10 may instruct the signal generating unit 21 to generate a signal or may control the signal generating unit 21 to generate a signal.

In the controller 10 illustrated in FIG. 3, the mode selecting unit 11 selects an operation mode of the electronic device 1. In one embodiment, the mode selecting unit 11 may select a radar mode as the operation mode of the electronic device 1. The radar mode selected by the mode selecting unit 11 is further described later. The operation mode of the electronic device 1 selected by the mode selecting unit 11 may be sent to the parameter setting unit 12 and the signal processor 40.

In the controller 10 illustrated in FIG. 3, the parameter setting unit 12 sets various parameters corresponding to the operation mode of the electronic device 1 selected by the mode selecting unit 11. In one embodiment, the parameter setting unit 12 may set various radar parameters corresponding to the radar mode, as the parameters corresponding to the operation of the electronic device 1. The parameters set by the parameter setting unit 12 may be stored in advance in any storage unit, or may be acquired by communication, for example. The parameters set by the parameter setting unit 12 are further described later. The parameters set by the parameter setting unit 12 may be sent to the transmission unit 20. In one embodiment, the parameters set by the parameter setting unit 12 may be sent to the signal generating unit 21 (see FIG. 3) of the transmission unit 20. The signal generating unit 21 of the transmission unit 20 generates a transmission signal (transmission wave) to be transmitted from the electronic device 1, based on the parameters sent from the parameter setting unit 12. The various radar parameters corresponding to the radar mode may include, for example, at least one selected from the group consisting of a transmission start frequency, a radio field intensity, a chirp slope (a rate of change in frequency with respect to time), a radio wave transmission period, a scattering cross section of an object, a radio wave transmission timing, a frequency band, and a sampling rate of an analog-to-digital converter.

In accordance with control performed by the controller 10, the signal generating unit 21 generates a signal (transmission signal) to be transmitted as a transmission wave T from each of the transmission antennas 25. As described above, the signal generating unit 21 may generate a transmission signal, based on the various parameters sent from the parameter setting unit 12. Specifically, when generating a transmission signal, the signal generating unit 21 may allocate a frequency of the transmission signal in accordance with the parameters set by the parameter setting unit 12, for example. For example, the signal generating unit 21 may allocate a frequency of the transmission signal in accordance with the parameters set by the parameter setting unit 12. For example, the signal generating unit 21 receives frequency information from the controller 10 or the any storage unit (memory) and generates a signal having a predetermined frequency in a frequency band such as from 77 GHz to 81

GHz, for example. The signal generating unit 21 may include a functional unit such as a voltage control oscillator (VCO), for example.

The signal generating unit 21 may be configured as hardware having the function, for example as a microcomputer, or for example as a processor such as a CPU and a program or the like executed by the processor. Each functional unit described below may also be configured as hardware having the function, for example as a microcomputer if possible, or for example as a processor such as a CPU and a program or the like executed by the processor if possible.

In the electronic device 1 according to the one embodiment, the signal generating unit 21 may generate a transmission signal (transmission chirp signal) such as a chirp signal, for example. In particular, the signal generating unit 21 may generate a signal (linear chirp signal) whose frequency changes linearly and periodically. For example, the signal generating unit 21 may generate a chirp signal whose frequency linearly and periodically increases from 77 GHz to 81 GHz as time elapses. For example, the signal generating unit 21 may generate a signal whose frequency periodically repeats a linear increase (up-chirp) from 77 GHz to 81 GHz and a decrease (down-chirp) as time elapses. For example, the controller 10 (the parameter setting unit 12) may set in advance the signal generated by the signal generating unit 21. For example, the any storage unit (memory) or the like may store in advance the signal generated by the signal generating unit 21. Since a chirp signal used in a technical field such as the radar is known, more detailed description is appropriately simplified or omitted. The signal generated by the signal generating unit 21 is supplied to the synthesizer 22.

Figure 5:
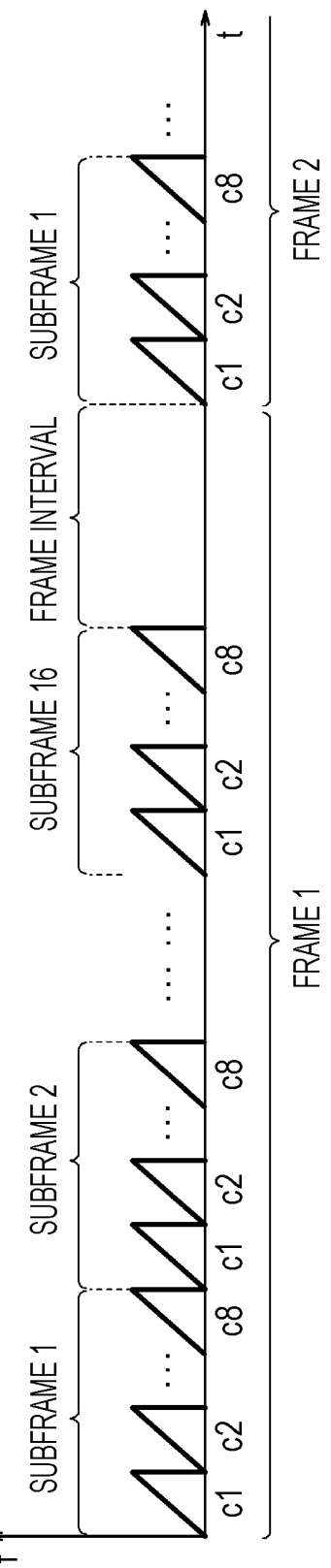
FIG. 5 is a diagram for describing a structure of a transmission signal according to the one embodiment.

FIG. 5 is a diagram for describing an example of chirp signals generated by the signal generating unit 21.

In FIG. 5, the horizontal axis represents elapsed time and the vertical axis represents a frequency. In the example illustrated in FIG. 5, the signal generating unit 21 generates linear chirp signals whose frequency changes linearly and periodically. FIG. 5 illustrates chirp signals c1, c2, . . . , c8. As illustrated in FIG. 5, the frequency of each chirp signal linearly increases as time elapses.

In the example illustrated in FIG. 5, one subframe includes eight chirp signals c1, c2, . . . , c8. That is, each of subframes such as a subframe 1 and a subframe 2 illustrated in FIG. 5 includes eight chirp signals c1, c2, . . . , c8. In the example illustrated in FIG. 5, one frame includes 16 subframes such as the subframes 1 to 16. That is, each of frames such as a frame 1 and a frame 2 illustrated in FIG. 5 includes 16 subframes. As illustrated in FIG. 5, a frame interval of a predetermined length may be included between frames. One frame illustrated in FIG. 5 may have a length of about 30 ms to 50 ms, for example.

In FIG. 5, the frame 2 and subsequent frames may have the same and/or similar configuration. In FIG. 5, the frame 3 and subsequent frames may have the same and/or similar configuration. In the electronic device 1 according to the one embodiment, the signal generating unit 21 may generate a transmission signal as any number of frames. In FIG. 5, an illustration of some chirp signals is omitted. As described above, for example, a relationship between time and a frequency of the transmission signal generated by the signal generating unit 21 may be set by the parameter setting unit 12 or may be stored in any storage unit (memory) or the like.

As described above, the electronic device 1 according to the one embodiment may transmit a transmission signal made up of subframes each including multiple chirp signals.

The electronic device 1 according to the one embodiment may transmit a transmission signal made up of frames each including a predetermined number of subframes.

In the description below, the electronic device 1 transmits a transmission signal having a frame structure illustrated in FIG. 5. However, the frame structure illustrated in FIG. 5 is an example. For example, the number of chirp signals included in one subframe is not limited to eight. In one embodiment, the signal generating unit 21 may generate a subframe including any number of (for example, multiple) chirp signals. The subframe structure illustrated in FIG. 5 is also an example. For example, the number of subframes included in one frame is not limited to 16. In one embodiment, the signal generating unit 21 may generate a frame including any number of (for example, multiple) subframes. The signal generating unit 21 may generate signals having different frequencies. The signal generating unit 21 may generate multiple discrete signals of bandwidths in which frequencies f are different from each other.

Referring back to FIG. 2, the synthesizer 22 increases the frequency of the signal generated by the signal generating unit 21 to a frequency in a predetermined frequency band. The synthesizer 22 may increase the frequency of the signal generated by the signal generating unit 21 to a frequency selected as a frequency of the transmission wave T to be transmitted from each of the transmission antennas 25. For example, the controller 10 (the parameter setting unit 12) may set the frequency selected as the frequency of the transmission wave T to be transmitted from each of the transmission antennas 25. For example, the any storage unit (memory) may store the frequency selected as the frequency of the transmission wave T to be transmitted from each of the transmission antennas 25. The signal whose frequency has been increased by the synthesizer 22 is supplied to the phase control unit 23 and the mixer 33. When the multiple phase control units 23 are present, the signal whose frequency has been increased by the synthesizer 22 may be supplied to each of the multiple phase control units 23. When the multiple reception units 30 are present, the signal whose frequency has been increased by the synthesizer 22 may be supplied to the mixer 33 of each of the multiple reception units 30.

Each of the phase control units 23 controls a phase of the transmission signal supplied from the synthesizer 22. Specifically, for example, in accordance with control performed by the controller 10, each of the phase control units 23 may appropriately advance or delay the phase of the signal supplied from the synthesizer 22 to adjust the phase of the transmission signal. In this case, based on a difference between paths of the respective transmission waves T to be transmitted from the multiple transmission antennas 25, the phase control units 23 may adjust the phases of the respective transmission signals. The phase control units 23 appropriately adjust the phases of the respective transmission signals, so that the transmission waves T transmitted from the multiple transmission antennas 25 enhance with each other in a predetermined direction to form a beam (beamforming). In this case, for example, the any storage unit (memory) may store a correlation between a direction of beamforming and amounts of phase by which the respective transmission signals transmitted by the multiple transmission antennas 25 are to be controlled. The transmission signal whose phase is controlled by each of the phase control units 23 is supplied to a respective one of the amplifiers 24.

The amplifier 24 amplifies power (electric power) of the transmission signal supplied from the phase control unit 23 in accordance with control performed by the controller 10, for example. When the sensor 5 includes the multiple transmission antennas 25, each of the multiple amplifiers 24 may amplify power (electric power) of the transmission signal supplied from a respective one of the multiple phase control units 23 in accordance with control performed by the controller 10, for example. Since the technique for amplifying power of a transmission signal is already known, more detailed description is omitted. The amplifier 24 is connected to the transmission antenna 25.

The transmission antenna 25 outputs (transmits), as the transmission wave T, the transmission signal amplified by the amplifier 24. When the sensor 5 includes the multiple transmission antennas 25, each of the multiple transmission antennas 25 may output (transmit), as the transmission wave T, the transmission signal amplified by a respective one of the multiple amplifiers 24. Since the transmission antennas 25 can have a configuration that is the same as and/or similar to the configuration of transmission antennas for use in the known radar technology, more detailed description is omitted.

Accordingly, the electronic device 1 according to the one embodiment, which includes the transmission antennas 25, can transmit transmission signals (for example, transmission chirp signals) as the transmission waves T from the respective transmission antennas 25. At least one of the functional units of the electronic device 1 may be housed in one housing. In this case, the one housing may have a hard-to-open structure. For example, the transmission antennas 25, the reception antennas 31, and the amplifiers 24 are desirably housed in one housing, and this housing desirably has a hard-to-open structure. When the sensor 5 is installed on the mobility device 100 such as an automobile, each of the transmission antennas 25 may transmit the transmission wave T to outside the mobility device 100 through a cover member such as a radar cover, for example. In this case, the radar cover may be made of a material, for example, a synthetic resin or rubber, that allows an electromagnetic wave to pass therethrough. This radar cover may also serve as a housing of the sensor 5, for example. Covering the transmission antennas 25 with a member such as the radar cover can reduce a risk of the transmission antennas 25 being damaged or malfunctioning because of a contact with an external object. The radar cover and the housing may also be referred to as a radome.

FIG. 2 illustrates an example of the electronic device 1 that includes two transmission antennas 25. However, in one embodiment, the electronic device 1 may include any number of transmission antennas 25. On the other hand, in one embodiment, the electronic device 1 may include the multiple transmission antennas 25 when the transmission waves T transmitted from the respective transmission antennas 25 form a beam in a predetermined direction. In one embodiment, the electronic device 1 may include multiple transmission antennas 25. In this case, the electronic device 1 may include the multiple phase control units 23 and the multiple amplifiers 24 to correspond to the multiple transmission antennas 25. Each of the multiple phase control units 23 may control the phase of a respective one of the multiple transmission waves supplied from the synthesizer 22 and to be transmitted from the respective transmission antennas 25. Each of the multiple amplifiers 24 may amplify power of a respective one of the multiple transmission signals to be transmitted from the respective transmission antennas 25. In this case, the sensor 5 may include the multiple transmission antennas. As described above, when the electronic device 1 illustrated FIG. 2 includes the multiple transmission antennas 25, the electronic device 1 may include multiple functional units necessary for transmitting the transmission waves T from the multiple transmission antennas 25.

The reception antenna 31 receives the reflected wave R. The reflected wave R may be the transmission wave T reflected off the predetermined object 200. The reception antenna 31 may include multiple antennas such as the reception antennas 31A to 31D, for example. Since the reception antennas 31 can have a configuration that is the same as and/or similar to the configuration of reception antennas for use in the known radar technology, more detailed description is omitted. The reception antenna 31 is connected to the LNA 32. A reception signal based on the reflected wave R received by the reception antenna 31 is supplied to the LNA 32.

The electronic device 1 according to the one embodiment can receive, from each of the multiple reception antennas 31, the reflected wave R that is the transmission wave T that has been transmitted as the transmission signal (transmission chirp signal) such as a chirp signal, for example, and has been reflected off the predetermined object 200. When the transmission chirp signal is transmitted as the transmission wave T in this manner, the reception signal based on the received reflected wave R is referred to as a reception chirp signal. That is, the electronic device 1 receives the reception signal (for example, the reception chirp signal) as the reflected wave R from each of the reception antennas 31. When the sensor 5 is installed on the mobility device 100 such as an automobile, each of the reception antennas 31 may receive the reflected wave R from outside the mobility device 100 through a cover member such as a radar cover, for example. In this case, the radar cover may be made of a material, for example, a synthetic resin or rubber, that allows an electromagnetic wave to pass therethrough. This radar cover may also serve as a housing of the sensor 5, for example. Covering the reception antennas 31 with a member such as the radar cover can reduce a risk of the reception antennas 31 being damaged or malfunctioning because of a contact with an external object. The radar cover and the housing may also be referred to as a radome.

When the antenna 31 is installed near the transmission antenna 25, one sensor 5 may collectively include these reception antenna 31 and transmission antenna 25, for example. That is, for example, one sensor 5 may include at least one transmission antenna 25 and at least one reception antenna 31. For example, one sensor 5 may include the multiple transmission antennas 25 and the multiple reception antennas 31. In such a case, one radar sensor may be covered with a cover member such as one radar cover, for example.

The LNA 32 amplifies, with low noise, the reception signal based on the reflected wave R received by the reception antenna 31. The LNA 32 may be a low-noise amplifier and amplifies, with low noise, the reception signal supplied from the reception antenna 31. The reception signal amplified by the LNA 32 is supplied to the mixer 33.

The mixer 33 mixes (multiplies) the reception signal having a radio frequency (RF) and supplied from the LNA 32 and the transmission signal supplied from the synthesizer 22 to generate a beat signal. The beat signal obtained by the mixer 33 through mixing is supplied to the IF unit 34.

The IF unit 34 performs frequency conversion on the beat signal supplied from the mixer 33 to decrease the frequency of the beat signal to an intermediate frequency (IF). The beat signal whose frequency has been decreased by the IF unit 34 is supplied to the AD conversion unit 35.

The AD conversion unit 35 digitizes the analog beat signal supplied from the IF unit 34. The AD conversion unit 35 may be configured as any analog-to-digital conversion circuit (Analog-to-Digital Converter (ADC)). The digitized beat signal obtained by the AD conversion unit 35 is supplied to the signal processor 40. More specifically, the digitized beat signal obtained by the AD conversion unit 35 is supplied to the distance FFT processing unit 41 (see FIG. 4) of the signal processor 40. When the multiple reception units 30 are present, the digitized beat signals obtained by the respective AD conversion units 35 may be supplied to the distance FFT processing unit 41 of the signal processor 40.

The signal processor 40 included in the electronic device 1 according to one embodiment may perform various kinds of signal processing on the signal (reception signal) output from the reception unit 30. To provide control and/or processing capabilities for executing various functions including signal processing, the signal processor 40 may include at least one processor, for example, a CPU or a DSP. The signal processor 40 may be collectively implemented by one processor, may be implemented by some processors, or may be implemented by discrete individual processors. In the one embodiment, the signal processor 40 may be configured as, for example, a CPU (hardware) and a program (software) executed by the CPU. The signal processor 40 may appropriately include a memory required for operations of the signal processor 40.

As illustrated in FIG. 4, the distance FFT processing unit 41 of the signal processor 40 estimates a distance between the mobility device 100 equipped with the electronic device 1 and the object 200, based on the beat signals supplied from the respective AD conversion units 35. The distance FFT processing unit 41 may include a processing unit that performs fast Fourier transform, for example. In this case, the distance FFT processing unit 41 may be configured as any circuit, any chip, or the like that performs fast Fourier transform (FFT).

The distance FFT processing unit 41 performs FFT processing (hereinafter, appropriately referred to as "distance FFT processing") on the digitized beat signals obtained by the AD conversion units 35 of the reception unit 30. The distance FFT processing is also referred to as 1D FFT processing. For example, the distance FFT processing unit 41 may perform FFT processing on complex signals supplied from the AD conversion units 35. The digitized beat signals obtained by the AD conversion units 35 can be represented as temporal changes in signal intensity (power). The distance FFT processing unit 41 performs FFT processing on such a beat signal, so that the beat signal can be represented as a signal intensity (power) for each frequency. If a peak in a result obtained by the distance FFT processing is equal to or greater than a predetermined threshold, the distance FFT processing unit 41 may determine that the predetermined object 200 is located at the distance corresponding to the peak. For example, a method is known in which an object (reflecting object) that reflects a transmission wave is determined to be present if a peak value that is equal to or greater than a threshold is detected from the average power or amplitude of a disturbance signal as in constant false alarm rate (CFAR)-based detection processing. For example, the threshold determining unit 43 (described later) may determine whether an object is present based on such a threshold.

As described above, the electronic device 1 according to the one embodiment can detect, as the target, the object 200 that reflects the transmission wave T, based on the transmission signal transmitted as the transmission wave T and the reception signal received as the reflected wave R.

The distance FFT processing unit 41 can estimate a distance to a predetermined object, based on one chirp signal (for example, c1 illustrated in FIG. 5). That is, the electronic device 1 can measure (estimate) the distance A illustrated in FIG. 1 by performing the distance FFT processing. Since a technique for measuring (estimating) a distance to a predetermined object by performing FFT processing on a beat signal is known, more detailed description is appropriately simplified or omitted. The result (for example, distance information) of the distance FFT processing performed by the distance FFT processing unit 41 may be supplied to the velocity FFT processing unit 42. The result of the distance FFT processing performed by the distance FFT processing unit 41 may also be supplied to another functional unit such as the threshold determining unit 43, for example.

The velocity FFT processing unit 42 estimates a relative velocity between the mobility device 100 equipped with the electronic device 1 and the object 200, based on the beat signals on which the distance FFT processing has been performed by the distance FFT processing unit 41. The velocity FFT processing unit 42 may include a processing unit that performs fast Fourier transform, for example. In this case, the velocity FFT processing unit 42 may be configured as a circuit, chip, or the like of any type that performs fast Fourier transform (FFT).

The velocity FFT processing unit 42 further performs FFT processing (hereinafter, appropriately referred to as "velocity FFT processing") on the beat signals on which the distance FFT processing unit 41 has performed the distance FFT processing. The velocity FFT processing is also referred to as 2D FFT (Doppler FFT) processing. For example, the velocity FFT processing unit 42 may perform FFT processing on the complex signals supplied from the distance FFT processing unit 41. The velocity FFT processing unit 42 can estimate a relative velocity of the predetermined object, based on a subframe (for example, the subframe 1 illustrated in FIG. 5) including chirp signals. When the distance FFT processing is performed on the beat signal in the above-described manner, multiple vectors can be generated. The velocity FFT processing unit 42 can estimate a relative velocity to the predetermined object by determining a phase of a peak in a result of the velocity FFT processing performed on these multiple vectors. That is, the electronic device 1 can measure (estimate) a relative velocity between the mobility device 100 and the predetermined object 200 illustrated in FIG. 1 by performing the velocity FFT processing. Since a technique for measuring (estimating) a relative velocity of a predetermined object by performing velocity FFT processing on a result of distance FFT processing is known, more detailed description is appropriately simplified or omitted. The result (for example, velocity information) of the velocity FFT processing performed by the velocity FFT processing unit 42 may be supplied to the threshold determining unit 43. The result (for example, velocity information) of the velocity FFT processing performed by the velocity FFT processing unit 42 may also be supplied to the threshold determining unit 43, for example. The result of the velocity FFT processing performed by the velocity FFT processing unit 42 may also be supplied to another functional unit such as the angle-of-arrival estimating unit 44, for example.

The threshold determining unit 43 performs determination processing for a distance and/or a relative velocity, based on the result of the distance FFT processing performed by the distance FFT processing unit 41 and/or the result of the velocity FFT processing performed by the velocity FFT processing unit 42. In one embodiment, the threshold determining unit 43 may perform the determination based on a predetermined threshold. For example, the threshold determining unit 43 may determine whether the result of the distance FFT processing performed by the distance FFT processing unit 41 and/or the result of the velocity FFT processing performed by the velocity FFT processing unit 42 exceeds a predetermined threshold. The threshold determining unit 43 may determine that an object is detected at the distance and/or the relative velocity exceeding the predetermined threshold.

The threshold determining unit 43 may output only a result that exceeds the predetermined threshold among the results of the distance FFT processing performed by the distance FFT processing unit 41 and/or the results of the velocity FFT processing performed by the velocity FFT processing unit 42. The operation performed by the threshold determining unit 43 may be the same as and/or similar to, for example, detection processing based on a constant false alarm rate (CFAR). In one embodiment, the operation performed by the threshold determining unit 43 may be processing based on Order Statistic CFAR (OS-CFAR). OS-CFAR is a method for setting a threshold based on ordered statistics and determining that a target is present if the signal intensity exceeds the threshold. The result of the threshold-based determination processing performed by the threshold determining unit 43 may be supplied to the angle-of-arrival estimating unit 44. The result of the processing performed by the threshold determining unit 43 may be supplied to another functional unit such as the object detecting unit 45 and/or the quality determining unit 46, for example.

When the electronic device 1 operates in multiple operation modes (radar modes), the threshold determining unit 43 may determine whether an object is present based on the threshold of the CFAR (for example, OS-CFAR) stored for each radar mode.

The angle-of-arrival estimating unit 44 may estimate the direction from which the reflected wave R arrives from the predetermined object 200, based on the result of the velocity FFT processing performed by the velocity FFT processing unit 42 and/or the output from the threshold determining unit 43. The angle-of-arrival estimating unit 44 may estimate the direction from which the reflected wave R arrives from the predetermined object 200, based on the result output from the threshold determining unit 43 among the results of the velocity FFT processing performed by the velocity FFT processing unit 42. The electronic device 1 can estimate the direction from which the reflected wave R arrives, by receiving the reflected wave R from the multiple reception antennas 31. For example, the multiple reception antennas 31 are arranged at a predetermined interval. In this case, the transmission wave T transmitted from the transmission antenna 25 is reflected off the predetermined object 200 to become the reflected wave R. Each of the multiple reception antennas 31 arranged at the predetermined interval receives the reflected wave R. The angle-of-arrival estimating unit 44 can estimate the direction from which the reflected wave R arrives at each of the multiple reception antennas 31, based on the phases of the respective reflected waves R received by the multiple reception antennas 31 and a difference between paths of the respective reflected waves R. That is, the electronic device 1 can measure (estimate) the angle of arrival θ illustrated in FIG. 1, based on the result of the velocity FFT processing.

In the electronic device 1 according to the one embodiment, the angle-of-arrival estimating unit 44 may estimate the direction from which the reflected wave arrives, based on complex signals received by the multiple reception antennas 31 at the velocity at which the object is determined to be present. As described above, the electronic device 1 according to the one embodiment can estimate an angle of the direction in which the object is present.

Various techniques for estimating a direction from which the reflected wave R arrives, based on a result of velocity FFT processing have been proposed. For example, known direction-of-arrival estimation algorithms include MUSIC (MUltiple SIgnal Classification), ESPRIT (Estimation of Signal Parameters via Rotational Invariance Technique), and the like. Thus, more detailed description of the known techniques is appropriately simplified or omitted. Information (angle information) of the angle of arrival θ estimated by the angle-of-arrival estimating unit 44 may be supplied to the object detecting unit 45.

In the electronic device 1 according to the one embodiment, the object detecting unit 45 determines whether an object is detected as the target (for example, by clustering), based on information on the direction (angle) from which the reflected wave arrives, information on the relative velocity to the target, and/or information on the distance to the target. The information on the direction (angle) from which the reflected wave arrives may be acquired from the angle-of-arrival estimating unit 44. The information on the relative velocity and the distance to the target may be acquired from the threshold determining unit 43. The information on the relative velocity to the target may be acquired from the velocity FFT processing unit 42. The information on the distance to the target may be acquired from the distance FFT processing unit 41. The object detecting unit 45 may calculate average power at points constituting the object detected as the target.

The object detecting unit 45 detects an object located in a range to which the transmission wave T is transmitted, based on the information supplied from at least any of the distance FFT processing unit 41, the velocity FFT processing unit 42, the threshold determining unit 43, or the angle-of-arrival estimating unit 44. The object detecting unit 45 may perform detection of an object by performing, for example, clustering processing based on the supplied distance information, velocity information, and angle information. For example, known algorithms used in clustering of data include DBSCAN (Density-based spatial clustering of applications with noise) and the like. In the clustering processing, for example, average power of points constituting the detected object may be calculated. At least any of the distance information, the velocity information, the angle information, and the power information of the object detected by the object detecting unit 45 may be supplied to the quality determining unit 46. The output from the object detecting unit 45 may also be supplied to another functional unit such as the ECU 50, for example. In this case, when the mobility device 100 is an automobile, communication may be performed using a communication interface such as a CAN (Controller Area Network), for example.

The quality determining unit 46 determines whether the input reception signal satisfies a predetermined quality. For example, the quality determining unit 46 may determine whether the angle variance of the point cloud related to the detected object is equal to or greater than a predetermined threshold. In one embodiment, to-be-used information of the point cloud related to the detected object may be pieces of data associated across frames by the object tracking unit 47. For example, the quality determining unit 46 may determine whether the signal quality of the reception signal is equal to or higher than a predetermined threshold. When the above-described angle variance of the point cloud is equal to or greater than the predetermined threshold or when the signal quality of the reception signal is not equal to or greater than the predetermined threshold, the quality determining unit 46 may provide the controller 10 with a notification to set a mode that enables detection of a distance to a distant object among the multiple operation modes of the radar. The storage unit 48 may store the information (for example, information indicating the to-be-set operation mode of the radar) which the quality determining unit 46 thus notifies the controller 10 of.

The quality determining unit 46 may set the threshold (CFAR threshold) for detecting an object in the operation mode that enables detection of a distant object to be higher than the previous value. The storage unit 48 may store the information on the threshold (for example, information indicating the CFAR threshold) thus set by the quality determining unit 46.

The quality determining unit 46 may provide the controller 10 with a notification to direct the beam of the transmission waves toward the distant object. The storage unit 48 may store the information (for example, information indicating the direction to which the beam is to be directed) which the quality determining unit 46 thus notifies the controller 10 of. This allows the information indicating the direction in which the beam is to be directed to be used in the next frame (time). For example, the controller 10 may control the phase control units 23 to perform beamforming, based on the notified information indicating the direction of the beam.

The object tracking unit 47 may perform, for example, a process of predicting the target position, in the next frame, of the object subjected to the clustering processing. The object tracking unit 47 may use, for example, a Kalman filter to predict the position, in the next frame, of the object subjected to the clustering processing. The object tracking unit 47 may store the predicted position of the object in the next frame in the storage unit 48, for example.

In one embodiment, the object tracking unit 47 may store, in the storage unit 48 or the like, the operation mode in which the object has been detected based on the point cloud related to the detected object. For example, the object tracking unit 47 may store, in the storage unit 48 or the like, which of a first radar mode or a second radar mode the detected object has been detected in. In this case, the object tracking unit 47 may determine a priority order of the first radar mode and the second radar mode in accordance with whether the relative velocity estimated in the previous frame is constant. In an example below, a distance within which an object is detectable in the first radar mode may be greater (longer) than a distance within which an object is detectable in the second radar mode. Suppose that the radar according to the present disclosure has a maximum detection distance Rmax. The distance Rmax may be divided into three, for example. A distance of 0 or greater and less than Rmax/3 may be a short distance, a distance of Rmax/3 or greater and less than 2Rmax/3 may be an intermediate distance, and a distance of 2Rmax/3 or greater may be a long distance. The classification of the detection distance of the radar according to the present disclosure is not limited to such a case of division into three. For example, the classification of the detection distance of the radar according to the present disclosure may be division into two, division into four, division into N (N>5), or the like. The divided distances may have different intervals. The first radar mode may be applied to a long distance or an intermediate distance. The second radar mode may be applied to a short distance. Alternatively, the first radar mode may be applied to a long distance. The second radar mode may be applied to a short distance or an intermediate distance. The maximum detection distance Rmax may be, for example, 300 m, 200 m, 100 m, or 75 m. However, Rmax in the present disclosure is not limited to these numerical values. Rmax may be determined based on the chirp slope, the sampling rate of the analog-to-digital converter, the radar cross section of the target, the antenna design, and/or the like.

The object tracking unit 47 may use, for example, pieces of data that associate frames with each other based on the principle of object tracking, as the point cloud related to the detected object. In the object tracking, for example, the frames may be associated with each other based on a correlation between information (for example, a distance, an angle, a velocity, electric power, a variance amount of a point cloud, identification information, or the like) of the object predicted in the previous frame and stored in the storage unit 48 and information of the object observed in the current frame.

The object tracking unit 47 may use, for example, a Kalman filter to predict the next frame from the information of the object observed in the current frame associated in the above-described manner. In this case, the object tracking unit 47 may store the information of the object obtained by the prediction in the storage unit 48 or the like. The object tracking unit 47 may output the information of the object predicted in the current frame, which is calculated in the previous frame, among the information stored in the memory.

The storage unit 48 can store various kinds of information. The storage unit 48 may be, for example, a semiconductor memory or a magnetic disk. However, the storage unit 48 is not limited to these, and can be any storage device. The storage unit 48 may be, for example, a storage medium such as a memory card inserted to the electronic device 1 according to the present embodiment. The storage unit 48 may also be an internal memory of the CPU used as the controller 10 and/or the signal processor 40.

In one embodiment, the storage unit 48 may store information such as a threshold (for example, a CFAR threshold) for a reception signal in object detection, a phase used for directing the beam of the transmission waves toward a predetermined direction, the operation mode (radar mode) of the electronic device 1, and the like.

The controller 10 may control the operation mode of the electronic device 1, based on the information of the operation mode stored in the storage unit 48. More specifically, the mode selecting unit 11 of the controller 10 may select the operation mode of the electronic device 1, based on the information of the operation mode stored in the storage unit 48. The parameter setting unit 12 of the controller 10 may set the parameters that enable transmission of a predetermined transmission wave, based on the various parameters stored in the storage unit 48. The parameter setting unit 12 of the controller 10 may set various parameters necessary for the signal generating unit 21 to generate a transmission signal. The parameter setting unit 12 of the controller 10 may also set various parameters necessary for the phase control units 23 to form a beam of the transmission waves toward a predetermined direction (beamforming).

The threshold determining unit 43 may determine whether the reception signal in object detection is equal to or greater than a predetermined threshold, based on the information of the threshold (for example, the CFAR threshold) stored in the storage unit 48. The quality determining unit 46 may determine whether the reception signal has a predetermined quality or higher, based on the information of the signal quality stored in the storage unit 48. The object tracking unit 47 may track the detected object, based on the information stored in the storage unit 48.

For example, the ECU 50 (see FIG. 2) included in the electronic device 1 according to the one embodiment is capable of controlling the functional units of the mobility device 100 and controlling operations of the entire mobility device 100. To provide control and processing capabilities for executing various functions, the ECU 50 may include at least one processor, for example, a CPU (Central Processing Unit) or a DSP (Digital Signal Processor). The ECU 50 may be collectively implemented by one processor, may be implemented by some processors, or may be implemented by discrete individual processors. The processor may be implemented as one integrated circuit. The integrated circuit is also referred to as an IC. The processor may be implemented as multiple integrated circuits and discrete circuits connected to be able to perform communication. The processor may be implemented based on various other known technologies. In one embodiment, the ECU 50 may be configured as, for example, a CPU and a program executed by the CPU. The ECU 50 may appropriately include a memory necessary for operations of the ECU 50. At least part of the functions of the controller 10 may be functions of the ECU 50, or at least part of the functions of the ECU 50 may be functions of the controller 10.

The electronic device 1 illustrated in FIG. 2 includes the two transmission antennas 25 and the four reception antennas 31. However, the electronic device 1 according to the one embodiment may include any number of transmission antennas 25 and any number of reception antennas 31. For example, since the electronic device 1 includes the two transmission antennas 25 and the four reception antennas 31, the electronic device 1 can be considered to include a virtual antenna array virtually including eight antennas. As described above, the electronic device 1 may receive the reflected wave R of 16 subframes illustrated in FIG. 5 by using, for example, the eight virtual antennas.

An operation of the electronic device 1 according to the one embodiment is described.

As described above, the electronic device 1 according to the one embodiment transmits a transmission wave from the transmission antenna and receives, from the reception antenna, a reflected wave that is the transmission wave reflected off an object. The electronic device 1 according to the one embodiment may detect the object that reflects the transmission wave, based on the transmission signal and/or the reception signal. The electronic device 1 according to the one embodiment determines whether the object thus detected is a predetermined target. An algorithm of the processing performed by the electronic device 1 according to the one embodiment is further described below.

In the electronic device 1 according to the one embodiment, the mode selecting unit 11 of the controller 10 may read the operation mode of the electronic device 1, for example, from the storage unit 48 to select the operation mode, and may notify the parameter setting unit 12 and the signal processor 40 of the selected operation mode. The parameter setting unit 12 sets a parameter of the operation mode selected by the mode selecting unit 11, and notifies the transmission unit 20 of the set parameter. The storage unit 48 may store multiple radar parameters. The controller 10 can switch between the multiple radar modes, for example, within one frame of the transmission wave by setting the radar parameters with the parameter setting unit 12.

As described above, the electronic device 1 according to the one embodiment can transmit a transmission signal with the multiple transmission antennas 25 and receive a reception signal with the multiple reception antennas 31. As described above, the electronic device 1 according to the one embodiment can transmit a transmission wave while switching between the multiple operation modes (radar modes). The electronic device 1 according to the one embodiment can perform multiple types of beamforming in each of the multiple radar modes.

Suppose that the electronic device 1 according to the one embodiment detects, for example, an object such as an approaching vehicle at a distant location while performing the operation described above. The term "distant location" may refer to a location that is away by a predetermined distance or more. For example, the distant location may be any location that does not include the vicinity of the electronic device 1, such as a location that is away by at least approximately 50 m. When detecting a distant object, the electronic device 1 according to the one embodiment may select an operation mode corresponding to detection of a distant object from among the multiple operation modes (radar modes). When detecting a distant object, the electronic device 1 according to the one embodiment may perform beamforming to direct the beam of the transmission waves toward the detected object.

In this case, the predetermined threshold (for example, the CFAR threshold) in object detection may be increased from the current threshold by a predetermined value. The predetermined value by which the predetermined threshold is increased may be, for example, a value adjusted so that a distant object is favorably detected. This allows the electronic device 1 according to the one embodiment to perform signal processing using a signal with improved quality. Thus, the electronic device 1 according to the one embodiment can accurately estimate the direction of arrival of the object, for example.

Figure 6:
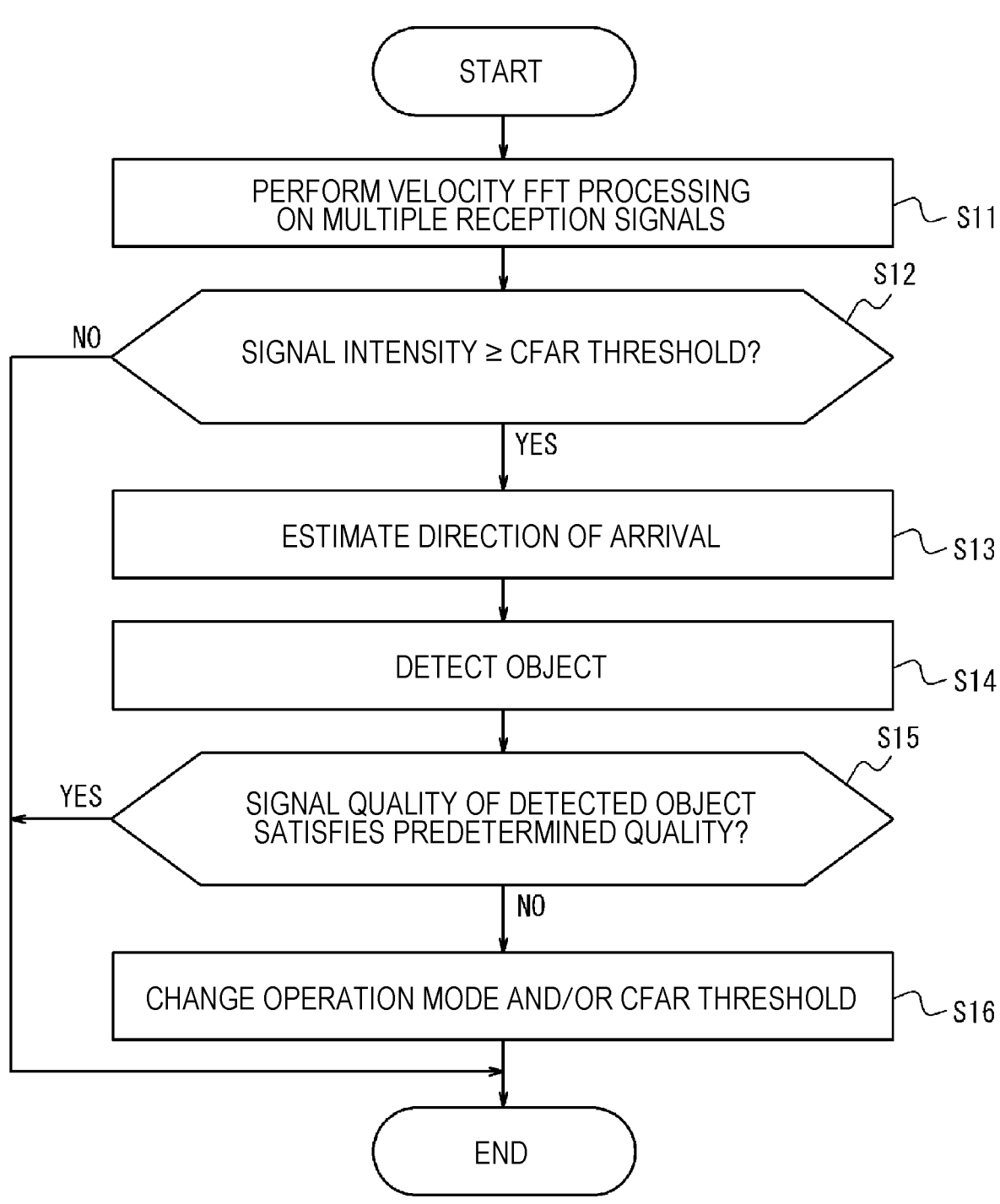
FIG. 6 is a flowchart for describing an operation performed by the electronic device according to the one embodiment.

FIG. 6 is a flowchart for describing an operation of the signal processor 40 of the electronic device 1 according to the one embodiment.

The operation illustrated in FIG. 6 may be repeatedly performed for each frame of the transmission wave, for example. The operation illustrated in FIG. 6 may be an operation performed by the signal processor 40 in the electronic device 1 according to the one embodiment. Thus, apart from the operation illustrated in FIG. 6, for example, the transmission unit 20 may transmit a transmission signal from the transmission antennas 25, and the reception unit 30 may receive reception signals from the reception antennas 31.

In response to the start of the operation illustrated in FIG. 6, the velocity FFT processing unit 42 may perform velocity FFT processing on multiple reception signals (step S11).

After the velocity FFT processing is performed in step S11, the threshold determining unit 43 may determine whether the signal intensity of each reception signal subjected to the velocity FFT processing is equal to or greater than a predetermined threshold (step S12). The predetermined threshold may be a predetermined CFAR threshold.

If it is determined in step S12 that the signal intensity is equal to or greater than the predetermined threshold, the angle-of-arrival estimating unit 44 estimates a direction of arrival of the detected object (step S13). On the other hand, if it is determined in step S12 that the signal intensity is not equal to or greater than the threshold, the signal processor 40 may end the operation illustrated in FIG. 6.

After the direction of arrival is estimated in step S13, the object detecting unit 45 detects an object, based on the processing results obtained so far (step S14).

After an object is detected in step S14, the quality determining unit 46 determines whether the signal quality for the detected object satisfies a predetermined quality (step S15).

If the signal quality for the object satisfies the predetermined quality in step S15 (YES), the quality determining unit 46 may end the operation illustrated in FIG. 6. On the other hand, if the signal quality of the object does not satisfy the predetermined quality (NO) in step S15, the quality determining unit 46 performs an operation of the next step S16. In the present disclosure, the case where the signal quality for the object does not satisfy the predetermined quality (NO) is settable by an appropriate combination of conditions such as the angle variance of the point cloud associated with the detected object being equal to or greater than a threshold or the signal intensity of the reception signal being equal to or less than a threshold, for example.

Figures 7A, 7B:
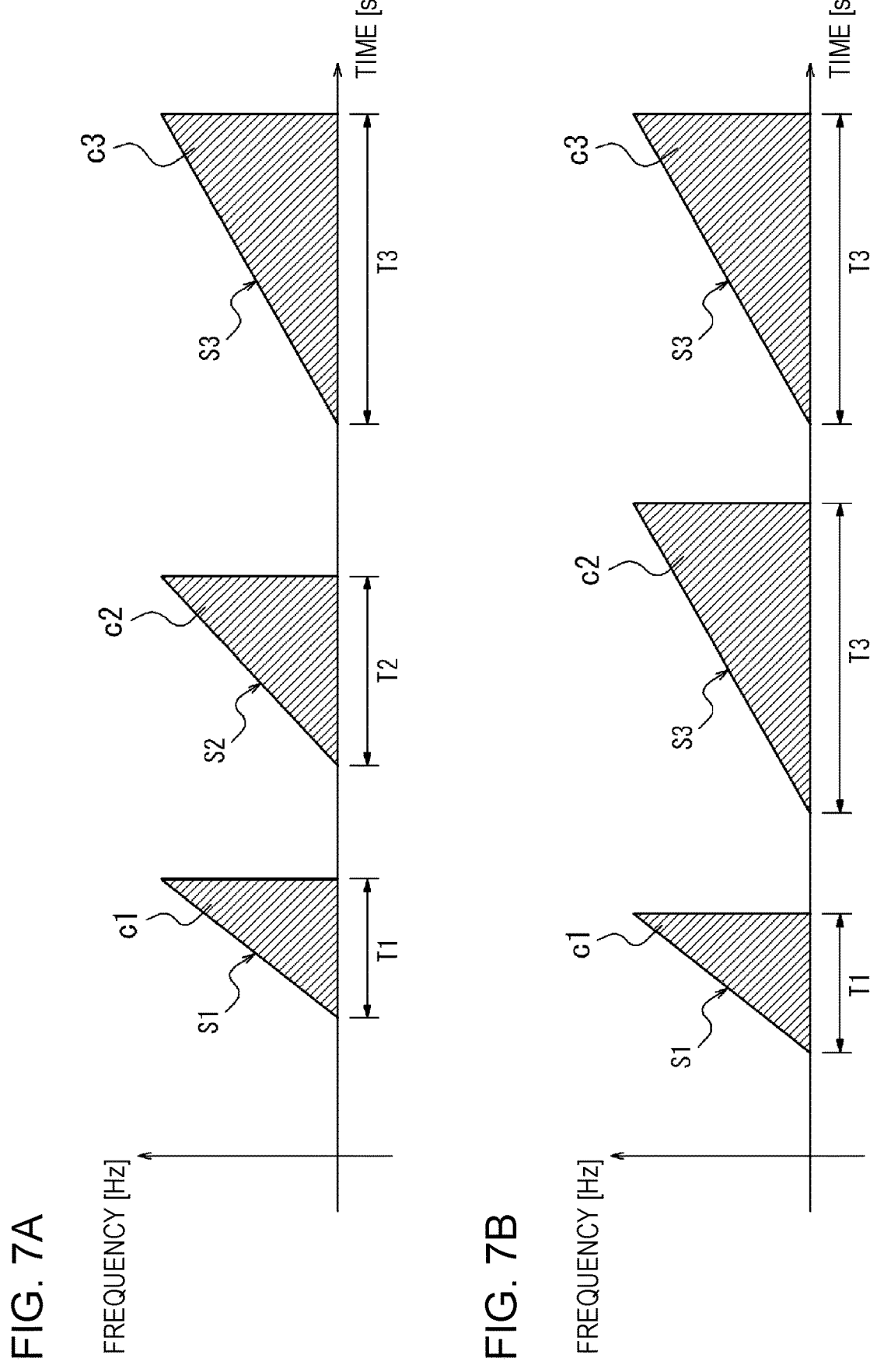
FIGS. 7A and 7B are schematic diagrams for describing the operation performed by the electronic device according to the one embodiment.

In step S16, the quality determining unit 46 stores, in the storage unit 48, information for directing the beam of the transmission waves in at least one or more operation modes among multiple operation modes toward the detected object. In the next frame, the controller 10 reads necessary information from the storage unit 48 and thus can direct the beam of the transmission waves in the at least one or more operation modes among the multiple operation modes toward the detected object. The controller 10 controls the beam of the transmission waves to set the multiple operation modes to be distant operation modes. This point will be described with reference to FIGS. 7A and 7B. FIGS. 7A and 7B are diagrams schematically illustrating an operation of the electronic device 1 according to the one embodiment.

As illustrated in FIG. 7A, the controller 10 initially operates in an operation mode in which transmission signals such as chirp signals c1, c2, and c3 are transmitted from the transmission unit 20. In FIGS. 7A and 7B, S1, S2, and S3 denote chirp slopes of the chirp signals c1, c2, and c3, respectively. The chirp slopes of the respective chirp signals satisfy $S1>S2>S3$. T1, T2, and T3 denote transmission periods of the chirp signals c1, c2, and c3, respectively. The transmission periods of the respective chirp signal satisfy $T1<T2<T3$. The chirp signal c1 may correspond to a short distance. The chirp signal c2 may correspond to an intermediate distance. The chirp signal c3 may correspond to a long distance.

If the signal quality for the object does not satisfy the predetermined quality (NO) in step S15 illustrated in FIG. 6, the controller 10 changes the operation mode of the chirp signals as illustrated in FIG. 7B. The operation mode of the chirp signals may be changed in the same frame or subframe, or in the next frame or subframe. That is, in this case, the controller 10 may set the chirp slope of the chirp signal c2 to S3 to make the chirp signal be the transmission wave in the long-distance operation mode. Such a configuration allows, when the signal quality for the object does not satisfy the predetermined quality (NO), the electronic device 1 to transmit the transmission wave in a distant mode and thus perform appropriate object detection.

The chirp signals illustrated in FIGS. 7A and 7B are an example. In one embodiment, chirp signals other than the signals illustrated in FIGS. 7A and 7B may be used. In one embodiment, the maximum frequencies of the different chirp signals may be different. The number of types of chirp signals is not limited to three, and may be two or four or more. If the signal quality for the object does not satisfy the predetermined quality (NO) in S15 of FIG. 6, the controller 10 may set the operation mode of transmission of any of the chirp signals to an operation mode farther than the current operation mode of transmission such as setting the operation mode to an intermediate-distance operation mode. In the case of NO in S15 of FIG. 6, the controller 10 may set the operation mode of transmission of M (M<N) chirp signals among N chirp signals being transmitted to an operation mode farther than the current operation mode of transmission, where N is an integer of 2 or greater.

In the case of NO in S15 of FIG. 6, the controller 10 may change the operation mode in S16 not only by changing the value of the chirp slope S but also by appropriately combining various radar parameters corresponding to the radar mode. The various radar parameters corresponding to the radar mode may be a transmission start frequency, a radio wave intensity, a radio wave transmission period, a scattering cross section of an object, a radio wave transmission timing, a frequency band, a sampling rate of an analog-to-digital converter, and the like.

In step S16, the quality determining unit 46 may increase the threshold (CFAR threshold) in object detection from the current threshold by a predetermined value. The quality determining unit 46 may store the threshold (CFAR threshold) increased by the predetermined value in the storage unit 48. Consequently, the threshold determining unit 43 can read necessary information from the storage unit 48 and thus can perform a determination using the threshold increased by the predetermined value. The controller 10 may perform both the change of the operation mode of the transmission waves and the change of the CFAR threshold performed in the S16 or may perform either the change of the operation mode of the transmission waves or the change of the CFAR threshold.

As described above, the signal processor 40 calculates a distance between the electronic device 1 and an object that reflects a transmission wave, based on a transmission signal transmitted as the transmission wave and a reception signal received as a reflected wave. The controller 10 performs control for transmitting the transmission wave in an operation mode corresponding to the distance between the electronic device 1 and the object, based on the quality of the reception signal determined by the quality determining unit 46.

The controller 10 may perform beamforming of the transmission wave, based on the quality of the reception signal determined by the quality determining unit 46. For example, the controller 10 may determine whether to perform beamforming of the transmission wave in accordance with the quality of the reception signal determined by the quality determining unit 46.

As described above, the controller 10 may control the electronic device 1 to operate in a first operation mode and a second operation mode that have different transmission modes of the transmission wave. The signal processor 40 may set a threshold for determining detection of the object in the second operation mode to be higher than a threshold for determining detection of the object in the first operation mode.

The signal processor 40 may determine whether to set the object as a target to be preferentially detected, based on a time to an arrival of the object at the electronic device 1.

In the one embodiment, in response to detection of an object at a distant location from the electronic device 1, the electronic device 1 can direct a beam of transmission waves from multiple radars toward the object. In the one embodiment, in response to detection of an object at a distant location from the electronic device 1, the electronic device 1 according to the one embodiment changes a CFAR threshold and/or a threshold of the signal quality to be higher. Thus, the electronic device 1 according to the one embodiment can improve the quality of the reception signal used in object detection. Consequently, the electronic device 1 according to the one embodiment can improve the accuracy of estimating the angle of arrival of the detected object, for example.

In a common radar technology, for example, a threshold for determining detection may be conceivably controlled in accordance with the intensity of a signal for detecting an object. However, in such control, if the signal intensity is low, lowing the threshold increases a likelihood of detecting an object. On the other hand, in such control, the quality of the signal deteriorates. Thus, for example, the deterioration in the accuracy in estimating the angle of arrival of the object is also expected. The electronic device 1 according to the one embodiment can improve the quality of the reception signal in object detection and improve the accuracy of estimating the angle of arrival of the detected object.

While the present disclosure has been described based on the various drawings and the embodiments, it is to be noted that a person skilled in the art can easily make various variations or corrections based on the present disclosure. Therefore, it is to be noted that these variations or corrections are within the scope of the present disclosure. For example, functions and the like included in each functional unit can be rearranged without causing any logical contradiction. Multiple functional units or the like may be combined into one or may be divided. The embodiments according to the present disclosure described above are not limited to strict implementation according to the respective embodiments described above, and may be implemented by appropriately combining the features or omitting part thereof. That is, a person skilled in the art can make various variations and corrections to the contents of the present disclosure based on the present disclosure. Therefore, these variations and corrections are within the scope of the present disclosure. For example, in each embodiment, each functional unit, each means, each step, or the like can be added to another embodiment or replaced with each functional unit, each means, each step, or the like in another embodiment without causing any logical contradiction. In each embodiment, multiple functional units, means, steps, or the like may be combined into one or may be divided. The embodiments of the present disclosure described above are not limited to strict implementation according to the respective embodiments described above, and may be implemented by appropriately combining the features or omitting part thereof.

For example, in the embodiments described above, the description has been given of the configuration in which the object detection ranges are dynamically switched between by using the one sensor 5. However, in one embodiment, detection of an object may be performed in the determined object detection ranges by using the multiple sensors 5. In one embodiment, beamforming may be performed toward the determined object detection ranges by using the multiple sensors 5.

The embodiments described above are not limited only to implementation as the electronic device 1. For example, the embodiments described above may be implemented as a method for controlling a device such as the electronic device 1. For example, the embodiments described above may be implemented as a program executed by a device such as the electronic device 1, a computer, or the like.

The electronic device 1 according to one embodiment may include, as the minimum configuration, at least part of at least one of the sensor 5 or the controller 10, for example. On the other hand, the electronic device 1 according to one embodiment may appropriately include at least any of the signal generating unit 21, the synthesizer 22, the phase control units 23, the amplifiers 24, or the transmission antennas 25 illustrated in FIG. 2 in addition to the controller 10. The electronic device 1 according to the one embodiment may appropriately include at least any of the reception antenna 31, the LNA 32, the mixer 33, the IF unit 34, or the AD conversion unit 35 instead of or along with the functional units described above. The electronic device 1 according to the one embodiment may include any storage unit (memory). As described above, the electronic device 1 according to the one embodiment can employ various configurations. When the electronic device 1 according to the one embodiment is mounted in the mobility device 100, for example, at least any of the functional units described above may be installed at an appropriate place such as the inside of the mobility device 100. On the other hand, in one embodiment, for example, at least any of the transmission antennas 25 or the reception antennas 31 may be installed outside the mobility device 100.

REFERENCE SIGNS 1 electronic device
5 sensor
10 controller
11 mode selecting unit
12 parameter setting unit
20 transmission unit
21 signal generating unit
22 synthesizer
23 phase control unit
24 amplifier
25 transmission antenna
30 reception unit
31 reception antenna
32 LNA
33 mixer
34 IF unit
35 AD conversion unit
40 signal processor
41 distance FFT processing unit
42 velocity FFT processing unit
43 threshold determining unit
44 angle-of-arrival estimating unit
45 object detecting unit
46 quality determining unit
47 object tracking unit
48 storage unit
50 ECU
100 mobility device
200 object

The invention claimed is:

1. An electronic device comprising:
a transmission antenna configured to transmit a transmission wave;
a reception antenna configured to receive a reflected wave that is the transmission wave having been reflected;
a signal processor configured to calculate, based on a transmission signal transmitted as the transmission wave and a reception signal received as the reflected wave, a distance between the electronic device and an object that reflects the transmission wave;

a quality determining unit configured to determine a quality of the reception signal based on whether an angle of variance of a point cloud related to the object is equal to or greater than an angle of variance threshold; and
a controller configured to perform control for transmitting the transmission wave in an operation mode corresponding to the distance between the electronic device and the object, from among a plurality of operation modes corresponding to different distances between the electronic device and the object, based on the quality of the reception signal determined by the quality determining unit.

2. The electronic device according to claim 1, wherein the controller is configured to perform beamforming of the transmission wave, based on the quality determined by the quality determining unit.

3. The electronic device according to claim 1, wherein
the controller is configured to control the electronic device to operate in a first operation mode and a second operation mode that have different transmission modes of the transmission wave, and
the signal processor is configured to set a threshold for determining detection of the object in the second operation mode to be higher than a threshold for determining detection of the object in the first operation mode.

4. The electronic device according to claim 1, wherein the signal processor is configured to determine whether to set the object as a target to be detected, based on a time to an arrival of the object at the electronic device.

5. A method for controlling an electronic device:
transmitting a transmission wave;
receiving a reflected wave that is the transmission wave having been reflected;
calculating, based on a transmission signal transmitted as the transmission wave and a reception signal received as the reflected wave, a distance between the electronic device and an object that reflects the transmission wave;
determining a quality of the reception signal based on whether an angle of variance of a point cloud related to the object is equal to or greater than a predetermined threshold; and
performing control for transmitting the transmission wave in an operation mode corresponding to the distance between the electronic device and the object, from among a plurality of operation modes corresponding to different distances between the electronic device and the object, based on the quality of the reception signal.

6. A non-transitory computer-readable recording medium storing computer program instructions, which when executed by an electronic device, cause the electronic device to:
transmit a transmission wave;
receive a reflected wave that is the transmission wave having been reflected;
calculate, based on a transmission signal transmitted as the transmission wave and a reception signal received as the reflected wave, a distance between the electronic device and an object that reflects the transmission wave;
determine a quality of the reception signal based on whether an angle of variance of a point cloud related to the object is equal to or greater than a predetermined threshold; and
perform control for transmitting the transmission wave in an operation mode corresponding to the distance between the electronic device and the object, from among a plurality of operation modes corresponding to different distances between the electronic device and the object, based on the quality of the reception signal.

7. The electronic device according to claim 1, wherein the signal processor is configured to determine whether the object is present based on whether a signal intensity of the reception signal exceeds a signal intensity threshold, and the controller is configured to perform control for setting the signal intensity threshold based on the quality of the reception signal.

8. The electronic device according to claim 7, wherein the signal intensity threshold includes one of a constant false alarm rate (CFAR) or an ordered statistic CFAR (OS-FAR).

9. The electronic device according to claim 8, wherein the controller is configured to perform control for setting transmission parameters for transmitting the transmission wave in the operation mode, based on the quality of the reception signal, and the transmission parameters include at least one a transmission start frequency, a radio field intensity, a chirp slope, a radio wave transmission period, a scattering cross section of an object, a radio wave transmission timing, a frequency band, and a sampling rate of an analog-to-digital converter.

* * * * *